(12) United States Patent
Khurshudov et al.

(10) Patent No.: US 7,190,547 B2
(45) Date of Patent: Mar. 13, 2007

(54) METHODS FOR DETECTING CONTACT BETWEEN A READ-WRITE HEAD AND THE ACCESSED DISK SURFACE IN A HARD DISK DRIVE

(75) Inventors: Andrei Khurshudov, San Jose, CA (US); Vinod Sharma, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/028,115

(22) Filed: Dec. 30, 2004

(65) Prior Publication Data

US 2006/0146432 A1    Jul. 6, 2006

(51) Int. Cl.
*G11B 21/02* (2006.01)
(52) U.S. Cl. ....................................... 360/75
(58) Field of Classification Search ................. 360/31, 360/75, 25, 235.7, 294.3
See application file for complete search history.

(56) References Cited

U.S. PATENT DOCUMENTS

| | | | |
|---|---|---|---|
| 6,876,509 B2* | 4/2005 | Bonin et al. | 360/75 |
| 6,906,878 B2* | 6/2005 | Smith et al. | 360/31 |
| 6,934,123 B2* | 8/2005 | Kohira et al. | 360/235.7 |
| 6,950,266 B1* | 9/2005 | McCaslin et al. | 360/75 |
| 6,950,267 B1* | 9/2005 | Liu et al. | 360/75 |
| 2004/0145824 A1* | 7/2004 | Lee | 360/25 |
| 2005/0007687 A1* | 1/2005 | Feng et al. | 360/75 |
| 2005/0046985 A1* | 3/2005 | Morinaga et al. | 360/31 |
| 2005/0174665 A1* | 8/2005 | Zhang et al. | 360/25 |
| 2005/0243473 A1* | 11/2005 | Hu et al. | 360/294.3 |
| 2005/0254174 A1* | 11/2005 | Nikitin et al. | 360/235.7 |
| 2005/0264912 A1* | 12/2005 | Nikitin et al. | 360/75 |

* cited by examiner

Primary Examiner—Fred F. Tzeng
(74) Attorney, Agent, or Firm—Earle Jennings; GSS Law Group; Gregory Scott Smith

(57) ABSTRACT

Determining a contact condition between read-write head and accessed disk surface inside hard disk drive, where micro-actuator assembly mechanically couples to slider and electrically interacts through signal path. Signal path sensed, creating sensed feedback signal, used to determine contact condition, which indicates when read-write head is, or is not, in contact with accessed disk surface. Means for implementing this process. Contact condition is product of process. The process may respond to contact condition, altering read-write head flying height. Process may be implemented as operations of embedded control system and/or servo controller. Method of predictive failure analysis using the contact condition to estimate performance parameter and create performance degradation warning. Manufacture process collecting contact condition to partly create reliability estimate of the hard disk drive, which may be form of Mean Time to Failure. Manufacturing may further include screening the hard disk drive based upon the reliability estimate.

8 Claims, 13 Drawing Sheets

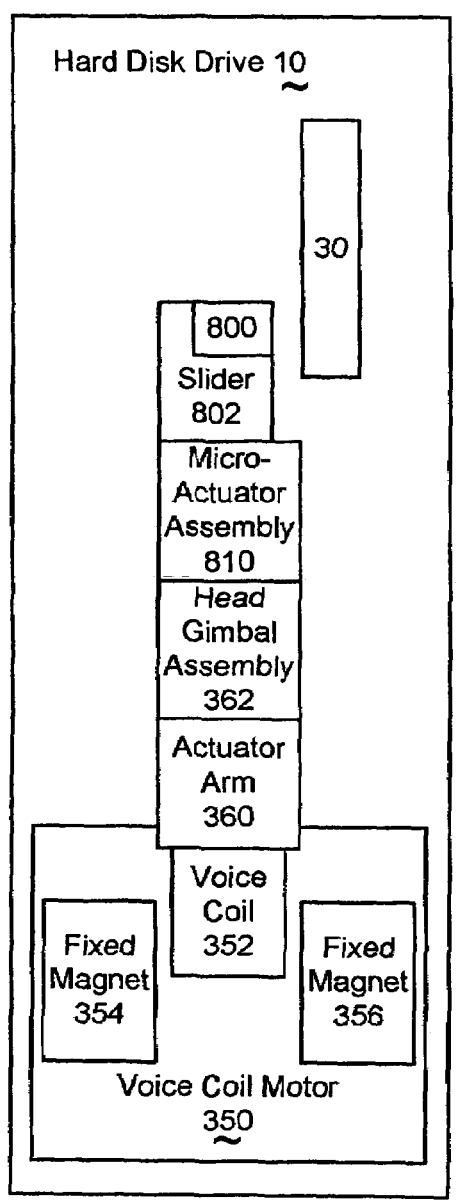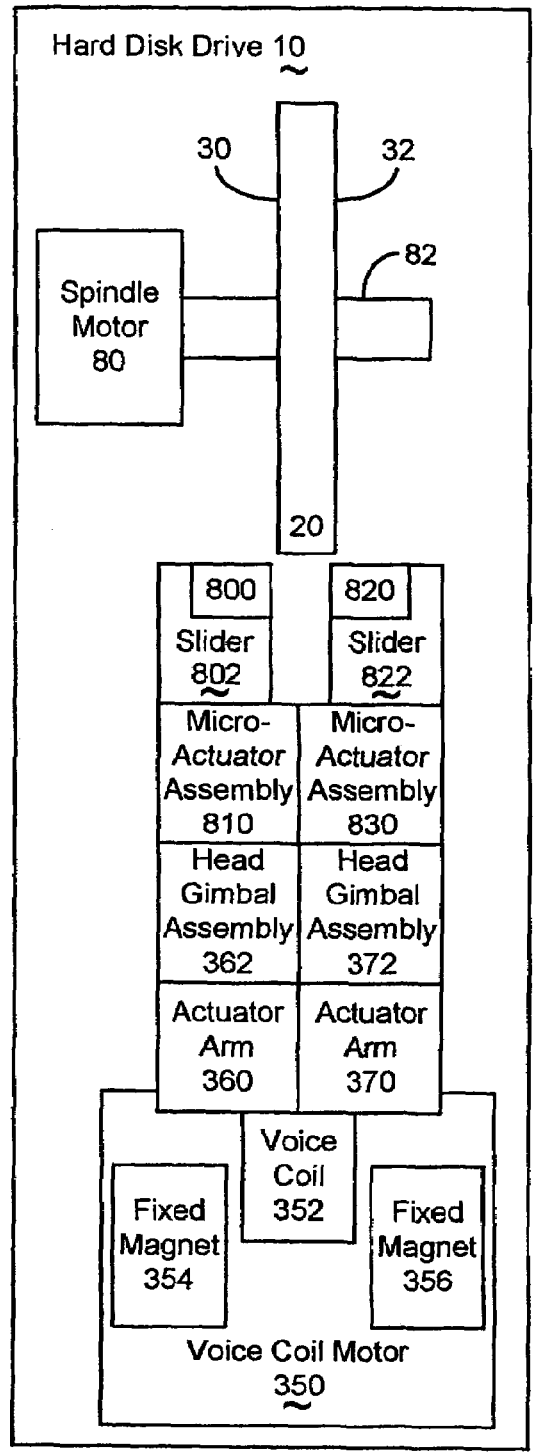
Fig. 9A
Fig. 9B

METHODS FOR DETECTING CONTACT BETWEEN A READ-WRITE HEAD AND THE ACCESSED DISK SURFACE IN A HARD DISK DRIVE

TECHNICAL FIELD

The invention relates to detecting contact between a read-write head and a disk surface accessed by the read-write head in a hard disk drive.

BACKGROUND OF THE INVENTION

Hard disk drives today must meet very stringent requirements. I current disk drive designs the read-write head flies only a few nanometers (nm) above the rotating disk surface, which the read-write head accesses. Contact between the read-write head and the disk surface tends to disrupt data access and possibly damage the data stored on the disk surface. Further, it is difficult to determine when the read-write head contacts the disk surface. Without knowing when there is contact, it is difficult, and often impossible, to avoid and/or fix such contacts.

What is needed are methods and apparatus which can detect read-write head contact with the accessed disk surface. What is further needed are methods of avoiding such contacts during the normal operation of the hard disk drive.

Today, many hard disk drive manufacturers use a form of predictive failure analysis known as SMART (Self-Monitoring Analysis and Reporting Technology) to monitor hard disk drive performance parameters to estimate predictable failures of the hard disk drive. Hard disk drive failures are classified as predictable failures, or unpredictable failures. Unpredictable failures occur without warning and often involve failures in integrated circuits and conductors. Predictable failures usually involve the observable changes in a performance parameter.

These performance parameters often include estimates of the following. A decline in the flying height of a read-write head over the accessed disk surface may indicate a coming head crash. If the hard disk drive is remapping many sectors due to internally detected errors, it is probably beginning to fail. When the Error Control and Correction (ECC) usage increases, whether or not the errors are correctable, this may signal the beginning of disk failure. Changes in spin-up time may indicate problems with the spindle motor. Increased internal temperature may indicate problems with the spindle motor. Reductions in data transfer rate can indicate any of several problems. These problems may lead to the failure of the hard disk drive. What is needed is increased sensitivity to the hard disk drive to improve the ability to predict hard disk drive failures.

Hard disk drives implement one of two approaches to parking the voice coil actuators in the hard disk drive. One approach uses a special latch mechanism located outside the disk(s), often known as an Impact Rebound crash stop. The other approach parks the sliders containing the read-write head(s) near the spindle shaft, which is known as the Crash Start-Stop approach. The Crash Start-Stop mechanism puts the read-write heads into contact with the disk surfaces near the spindle to park the voice coil actuator.

Additionally, a hard disk drive is a sealed unit. During the manufacturing process, once the hard disk drive is sealed, the ability to detect contact between the read-write head and the accessed disk surface is often impossible. In hard disk drives employing the Crash Start-Stop mechanism, the details of when the contact occurs is often important to determine the reliability of the unit, particularly regarding parking the voice coil actuator and unparking, or spinning up, the hard disk drive for normal operations.

To summarize, methods and apparatus are needed which can detect read-write head contact with their accessed disk surface. Further, methods are needed which avoid such contacts during the normal operation of the hard disk drive. Extensions to the Self-Monitoring Analysis and Reporting Technology are needed which include the apparatus and methods necessary to detect contact(s) and create a contact event log. Further extensions are needed which can predict problems based upon the contact event log. Manufacturing processes are needed which can detect contacts after a hard disk drive is sealed and use that information to improve reliability estimates for the hard disk drive during the burn-in of the sealed hard disk drive.

SUMMARY OF THE INVENTION

This invention includes a process for determining a contact condition between a read-write head and an accessed disk surface included in a hard disk drive. The hard disk drive includes a micro-actuator assembly mechanically coupled to a slider containing the read-write head flying over the accessed disk surface. The micro-actuator assembly electrically interacts through at least one signal path. The signal path is sensed to create a sensed feedback signal. The sensed feedback signal is used to determine the contact condition. The contact condition preferably indicates when the read-write head is in contact with the accessed disk surface, and when the read-write head is not in contact with the accessed disk surface.

The invention includes means for implementing the process steps. At least one of these means may use, but is not limited to, at least one of: a computer and/or a finite state machine. The computer may be part of the embedded control system or a part of the servo controller. The process may further be implemented using program steps of a program system directing the computer.

The contact condition is a product of the process. The process may further include responding to the contact condition to alter the flying height of the read-write head over the accessed disk surface. Altering the flying height may end the contact between the read-write head and the accessed disk surface, improving the ability of the read-write head to access the disk surface, and limit the possibility of damaging the accessed disk surface and/or read-write head. The process may be implemented as operations of the embedded control system and/or the servo controller.

The method of implementing the Self-Monitoring Analysis and Reporting Technology in the hard disk drive may include the following. Collecting the contact condition to create a contact event log. Using the contact event log to create at least partly an estimate of a performance parameter. Using the estimate of the performance parameter to create a performance degradation warning. The performance parameter may include a contact abnormality parameter for a track region, where most or all of the tracks of the accessed disk surface belong to one of the track regions. The performance parameter may further include at least one of a spin-up abnormality parameter and a landing abnormality parameter.

The hard disk drive manufacture process includes the following. Collecting the contact condition to create an initial contact event log. Using the initial contact event log to create at least partly an estimate of a reliability parameter. Using the estimate of the reliability parameter to create at least partly a reliability estimate of the hard disk drive. The reliability parameter may include a contact abnormality parameter for a track region, where most or all of the tracks of each accessed disk surface belong to one of the track regions. The reliability parameter may further include at least one of a spin-up abnormality parameter and a landing abnormality parameter. The reliability estimate of the hard disk drive may be a form of Mean Time to Failure.

The manufacturing process may further include screening the hard disk drive based upon the reliability estimate to create a screened hard disk drive. The screened hard disk drive is a product of this process.

The micro-actuator assembly may include at least one piezoelectric device contributing to the interaction with the signal path. The hard disk drive may include more than one accessed disk surface. The hard disk drive may include more than one disk. The micro-actuator assembly preferably includes at least one micro-actuator mechanically coupled to the slider. The micro-actuator assembly may include more than one micro-actuator. The micro-actuator and/or the micro-actuator assembly may preferably include at least two piezoelectric devices. The multiple piezoelectric devices may preferably interact through at least two signal paths.

BRIEF DESCRIPTION OF THE DRAWINGS

FIG. 9A shows the hard disk drive including the voice coil of FIG. 8B coupled with an actuator arm supporting the micro-actuator assembly and the read-write head;

FIG. 9B shows the hard disk drive of FIG. 9A with the voice coil further coupled with a second actuator arm supporting the second micro-actuator assembly and the second read-write head;

FIGS. 10A to 11A show the process for determining the contact condition of FIGS. 1 to 4, and 8B, implemented using the servo program system of FIG. 2 and 8B, which directs the servo computer;

DETAILED DESCRIPTION

This invention includes a process for determining a contact condition between a read-write head and an accessed disk surface included in a hard disk drive. The hard disk drive includes a micro-actuator assembly mechanically coupled to a slider containing the read-write head flying over the accessed disk surface. The micro-actuator assembly electrically interacts through at least one signal path. The signal path is sensed to create a sensed feedback signal. The sensed feedback signal is used to determine the contact condition. The contact condition preferably indicates when the read-write head is in contact with the accessed disk surface, and when the read-write head is not in contact with the accessed disk surface.

The invention includes means for implementing the process steps. At least one of these means may use, but is not limited to, at least one of: a computer and/or a finite state machine. The computer may be part of the embedded control system or a part of the servo controller. The process may further be implemented using program steps of a program system directing the computer.

The contact condition is a product of the process. The process may further include responding to the contact condition to alter the flying height of the read-write head over the accessed disk surface. Altering the flying height may end the contact between the read-write head and the accessed disk surface, improving the ability of the read-write head to access the disk surface, and limit the possibility of damaging the accessed disk surface and/or read-write head. The process may be implemented as operations of the embedded control system and/or the servo controller.

Figure 1:
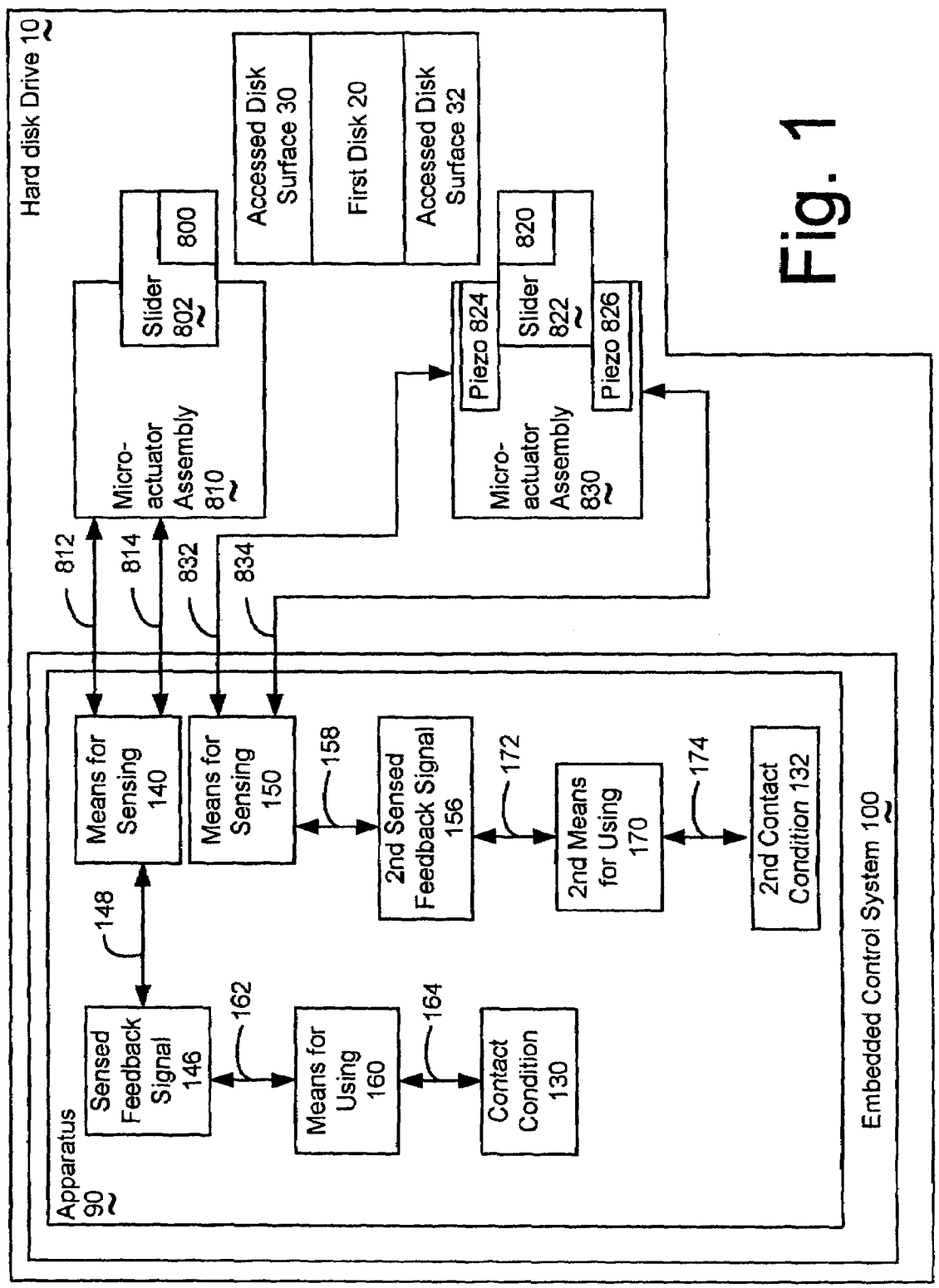
FIGS. 1 to 4 show the apparatus for determining the contact condition of the read-write head over the accessed disk surface in a hard disk drive, in accord with the invention.

FIG. 1 shows the apparatus for determining 90 the contact condition 130 of the read-write head 800 over the accessed disk surface 30 in a hard disk drive 10, in accord with the invention.

Figure 2:
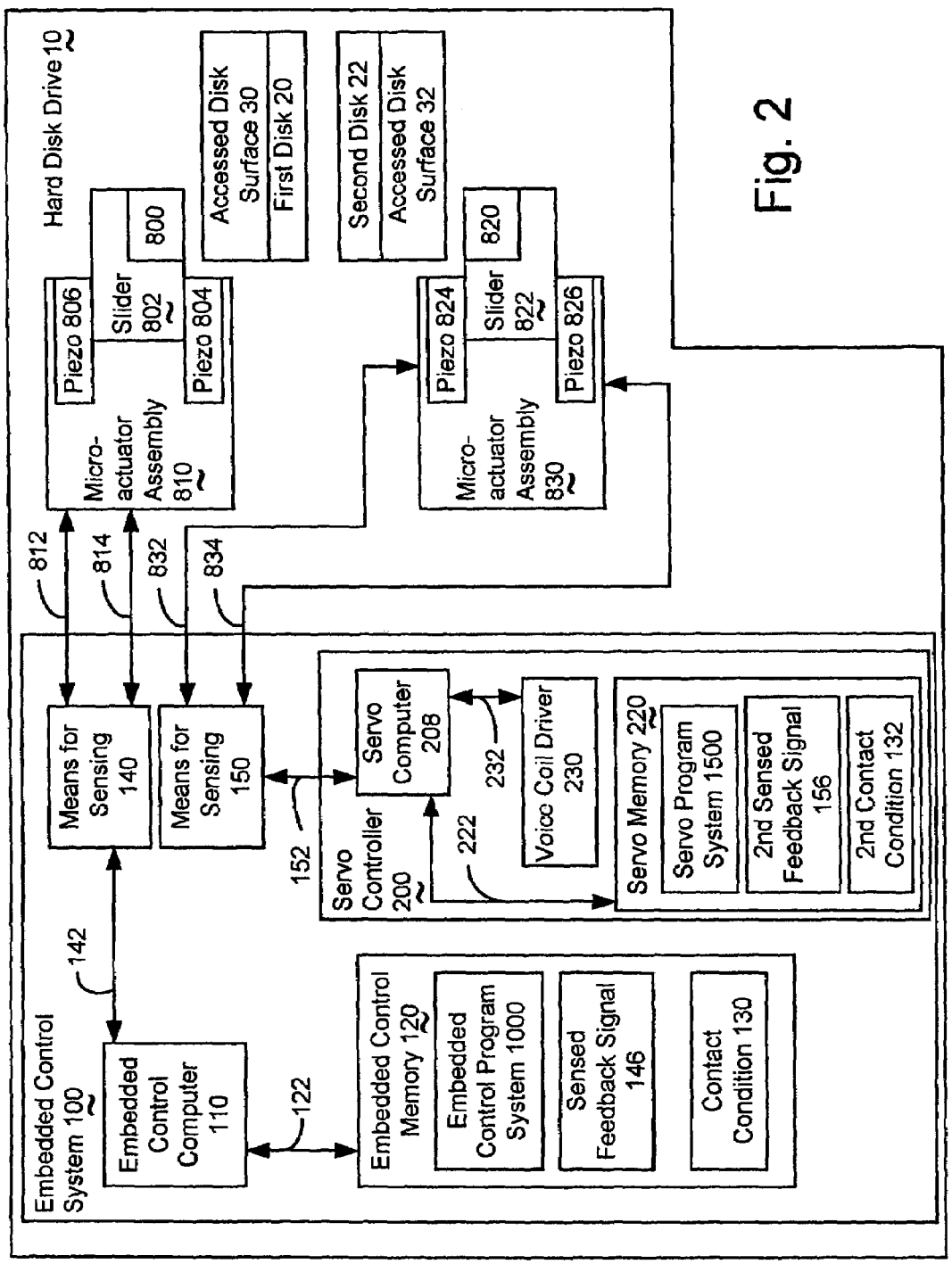

FIG. 2 shows an embodiment of the embedded control system 100 of FIG. 1 determining the contact condition 130 of the read-write head 800 over the accessed disk surface 30, and the second contact condition 132 of the second read-write head 820 over a second accessed disk surface 32.

Figure 3:
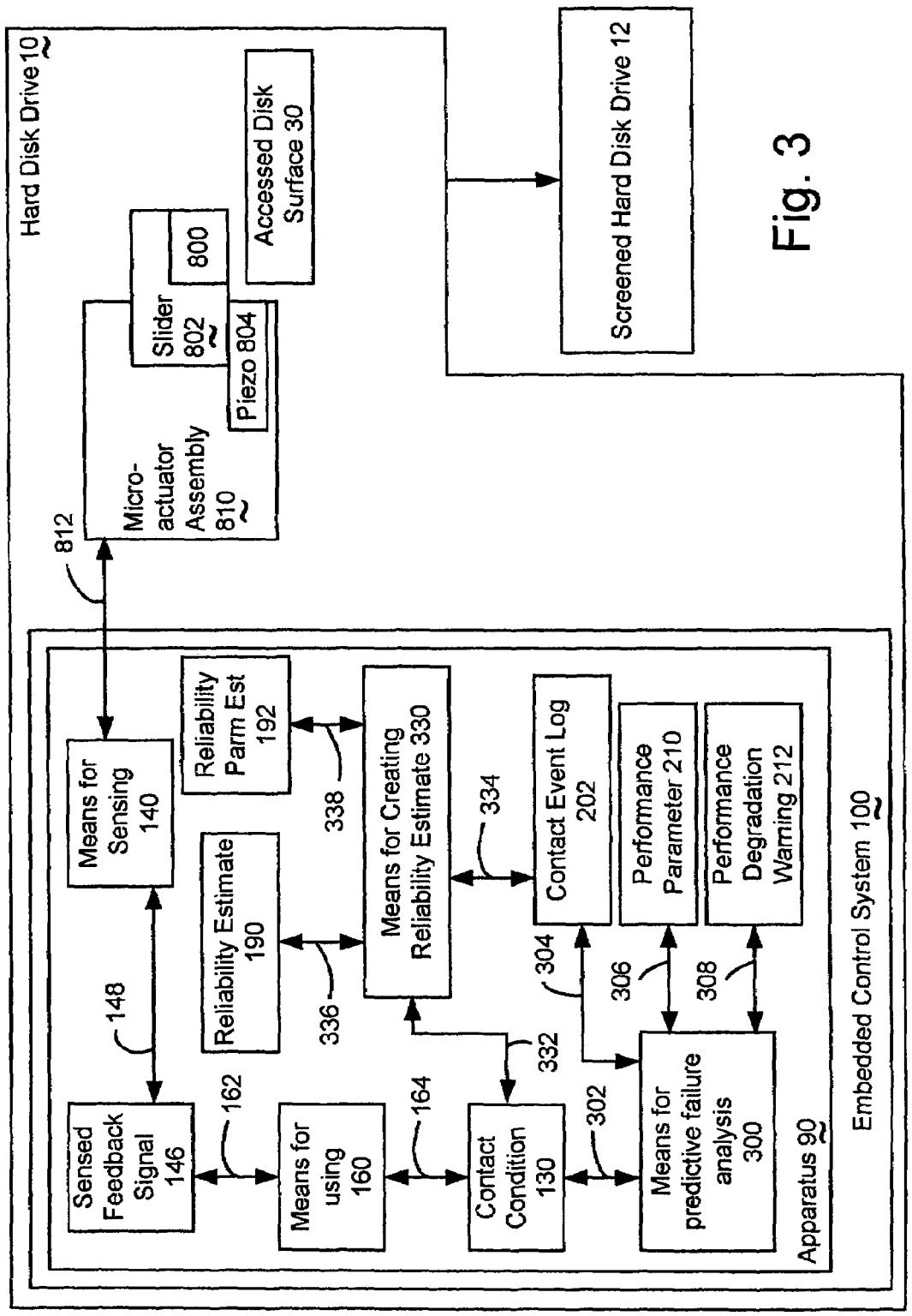

FIG. 3 shows the apparatus for determining 90 of FIG. 1, further including a means for predictive failure analysis 300 and a means for creating a reliability estimate 330, and the micro-actuator assembly 810 including a first piezoelectric device 804.

Figure 4:
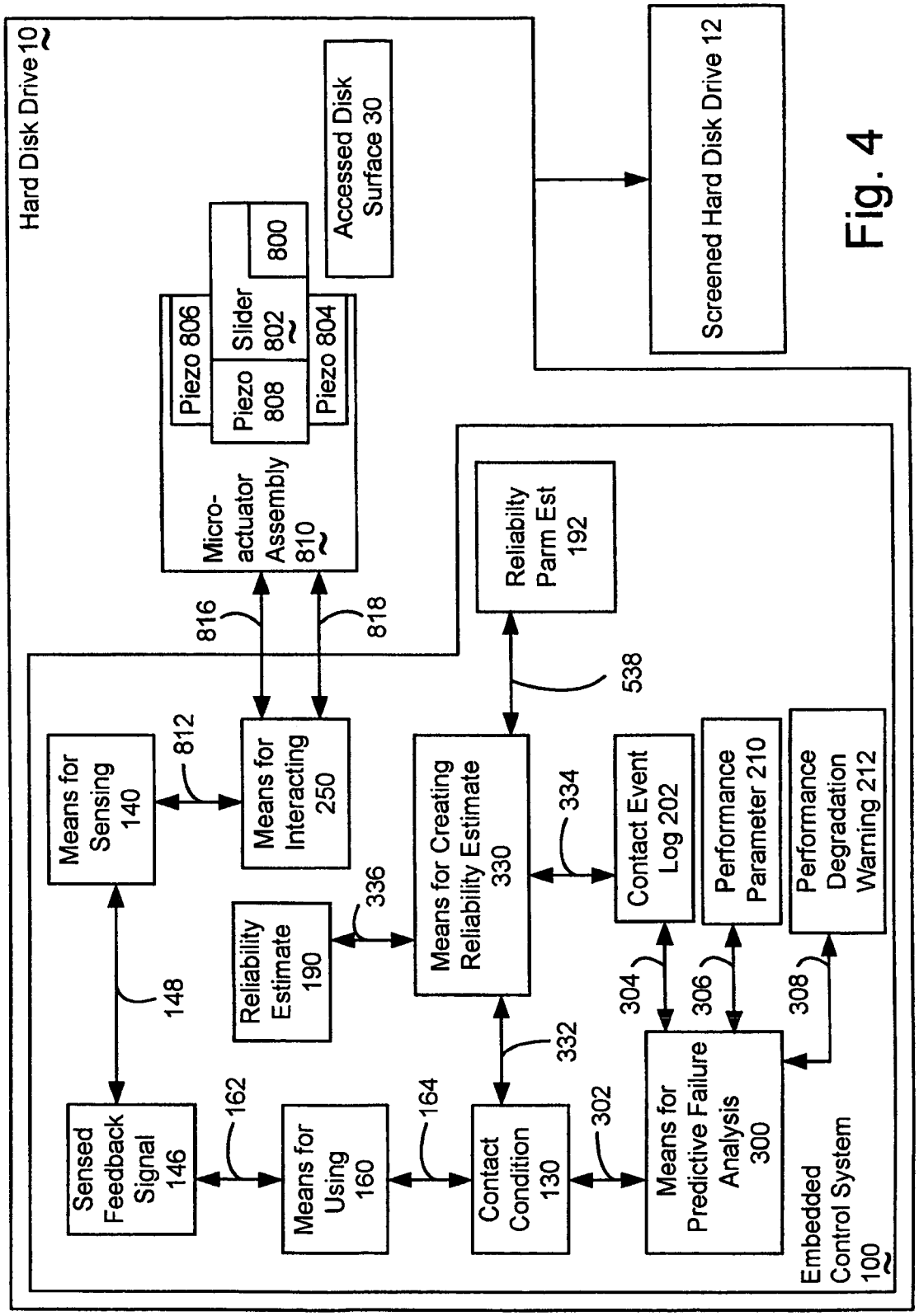

FIG. 4 shows the embedded control system 100 of FIG. 3. The embedded control system 100 further includes the micro-actuator assembly 810 including a first piezoelectric device 804, a second piezoelectric device 806 and a third piezoelectric device 808. The means for the micro-actuator assembly interacting 250 drives a micro-actuator control bundle 816 and a second micro-actuator control bundle 818.

In FIGS. 1 to 4, the invention includes a process for determining a contact condition 130 between a read-write head 800 and an accessed disk surface 30 included in a hard disk drive 10. The hard disk drive 10 includes a micro-actuator assembly 810 mechanically coupled to a slider 802 containing the read-write head 800 flying over the accessed disk surface 30. The micro-actuator assembly 810 electrically interacts through at least one signal path 812. The signal path 812 is sensed 140 to create a sensed feedback signal 146. The sensed feedback signal 146 is used 160 to determine the contact condition 130. The contact condition 130 preferably indicates when the read-write head is in contact with the accessed disk surface, and when the read-write head is not in contact with the accessed disk surface.

In FIG. 1, the apparatus for determining 90 the contact condition 130 includes the following. The means for sensing 140 the signal path 812 to create 148 the sensed feedback signal 146. And the means for using 160 the sensed feedback signal 146 to create 164 the contact condition 130. The apparatus for determining 90 may be included in the embedded control system 100 of the hard disk drive 10. The apparatus for determining 90 may further be preferred to be the embedded control system 100.

In FIG. 2, the means for using 160 is implemented by at least one program step of the embedded control program system 1000. The program steps of the embedded control program system 1000 reside in the embedded control memory 120. The embedded control memory 120 is first-accessibly-coupled 122 with the embedded control computer 110. The sensed feedback signal 146 may preferably reside in the embedded control memory 120. The contact condition 130 may preferably reside in the embedded control memory 120. The embedded control computer 110 is first-communicatively-coupled 142 with the means for sensing 140. Preferably, the embedded control program system 1000 further supports sensing the signal path 812 to create 148 the sensed feedback signal 146 residing in the embedded control memory 120.

The embedded control memory 120 shown in FIG. 2 preferably includes at least one non-volatile memory component. A non-volatile memory component retains its memory state, even when no power is applied to it. A volatile memory component tends to lose its memory state when no power is applied to it.

In FIGS. 1 and 2, the hard disk drive 10 further includes a second micro-actuator assembly 830. The second micro-actuator assembly 830 includes a second slider 822. The second slider 822 includes a second read-write head 820, which is flying over a second accessed disk surface 32.

Figure 5:
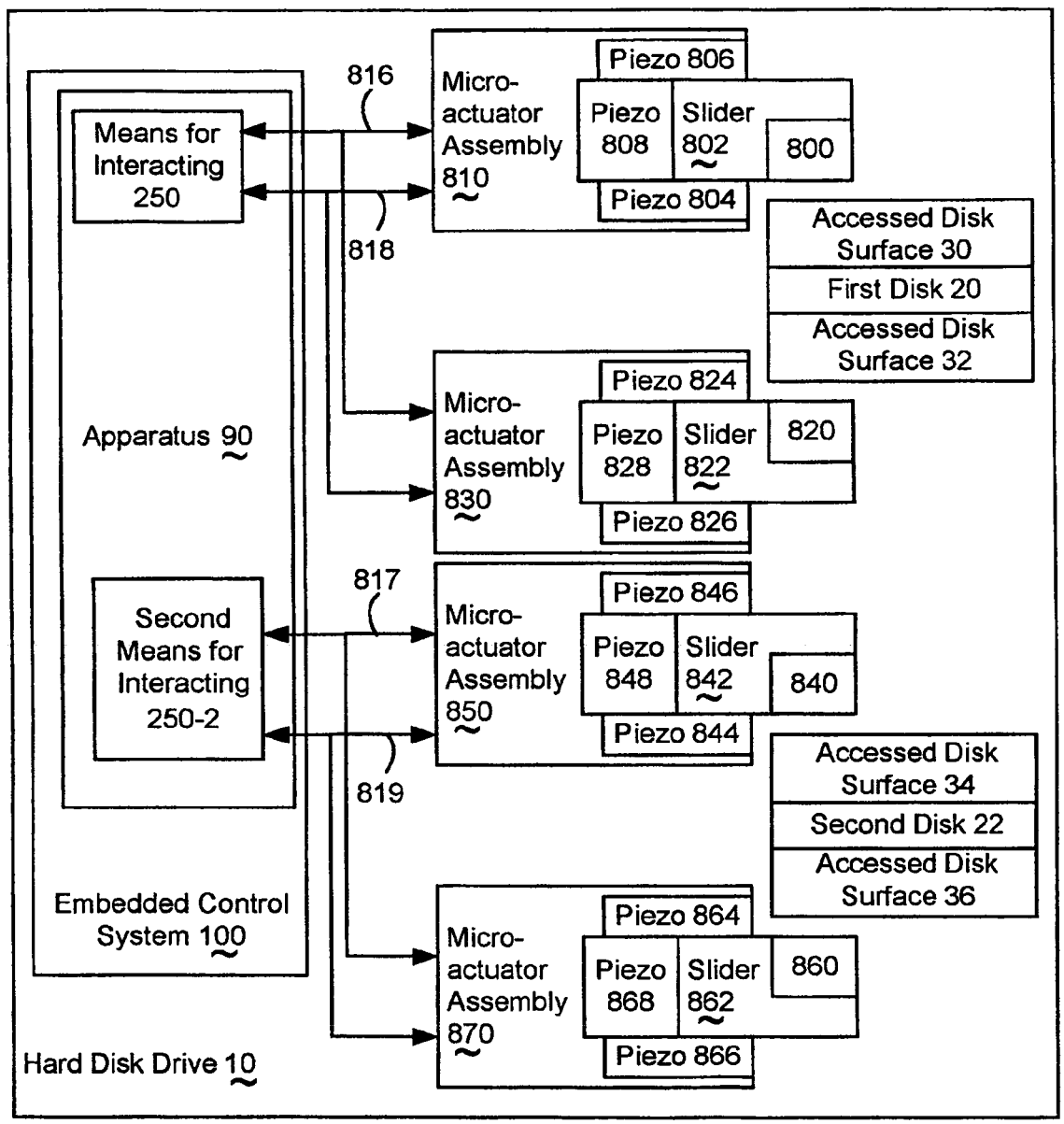
FIG. 5 shows a portion the hard disk drive of FIG. 4.

The hard disk drive 10 may include one accessed disk surface 30 as shown in FIGS. 3, 4, and 9A. The hard disk drive 10 may include more than one disk. The hard disk drive 10 may include the accessed disk surface 30 and a second accessed disk surface 32 as shown in FIGS. 1, 2, and 9B. In FIGS. 1, 5, and 9B, a first disk 20 includes the accessed disk surface 30 and the second accessed disk surface 32. In FIG. 2, the first disk 20 includes the accessed disk surface 30, and a second disk 22 includes the second accessed disk surface 32. In FIG. 5, the second disk 22 includes a third accessed disk surface 34 and a fourth accessed disk surface 36.

The micro-actuator assembly 810 may include more than one micro-actuator. The micro-actuator may employ at least one device using the piezoelectric effect. A device using the piezoelectric effect will be referred to as a piezoelectric device. Alternatively, the micro-actuator may employ at least one device using an electrostatic effect. The piezoelectric device may be used to sense contact between the read-write head 800 and the accessed disk surface 30. Either the piezoelectric effect and/or the electrostatic effect may be used to affect moving the read-write head 800 near the accessed disk surface 30. The movement may be laterally, among a small number of tracks on the accessed disk surface 30, and/or the movement may alter the flying height of the read-write head 800 above the accessed disk surface 30.

In FIG. 1, the apparatus for determining 90 further includes a second means for sensing 150 a second signal path 832. The second micro-actuator assembly 830 interacts with the second signal path 832 based upon a second mechanical coupling between the second micro-actuator assembly 830 and the second slider 822. The second means for sensing 150 creates (second-creates 158) a second sensed feedback signal 156. A second means for using 170 operates on the second sensed feedback signal 156 determines (second-determine 174) the second contact condition 132.

In FIG. 4, the embedded control system 100 may preferably include a means for the micro-actuator assembly interacting 250 with the signal path 812 based upon the mechanical coupling between the micro-actuator assembly 810 and the slider 802.

FIG. 5 shows a portion the hard disk drive 10 of FIG. 4, further including a second means for the micro-actuator assembly interacting 250-2. The means for the micro-actuator assembly interacting 250 drives the micro-actuator control bundle 816, which is shared by the micro-actuator assembly 810 and the second micro-actuator assembly 830. The micro-actuator control bundle 816 may affect the lateral position of read-write head 800 over the accessed disk surface 30. The micro-actuator control bundle 816 may affect the lateral position of the second read-write head 820 over the second accessed disk surface 32.

In many embodiments, the means for the micro-actuator assembly interacting 250 further drives the second micro-actuator control bundle 818, which is shared by the micro-actuator assembly 810 and the second micro-actuator assembly 830, as in FIG. 5. The second micro-actuator control bundle 818 may alter the flying height of the read-write head 800 over the accessed disk surface 30. The second micro-actuator control bundle 818 may alter the flying height of the second read-write head 820 over the second accessed disk surface 32.

In FIG. 5, the second means for the micro-actuator assembly interacting 250-2 drives the third micro-actuator control bundle 817, which is shared by the third micro-actuator assembly 850 and the fourth micro-actuator assembly 870. The third micro-actuator control bundle 817 may affect the lateral position of a third read-write head 840 over the third accessed disk surface 34. The third micro-actuator control bundle 817 may affect the lateral position of a fourth read-write head 860 over the fourth accessed disk surface 36.

In many embodiments, the second means for the micro-actuator assembly interacting 250-2 further drives the fourth micro-actuator control bundle 819, which is shared by the third micro-actuator assembly 850 and the fourth micro-actuator assembly 870, as in FIG. 5. The fourth micro-actuator control bundle 819 may alter the flying height of the third read-write head 840 over the third accessed disk surface 34. The fourth micro-actuator control bundle 819 may alter the flying height of the fourth read-write head 860 over the fourth accessed disk surface 36.

Figure 6A:
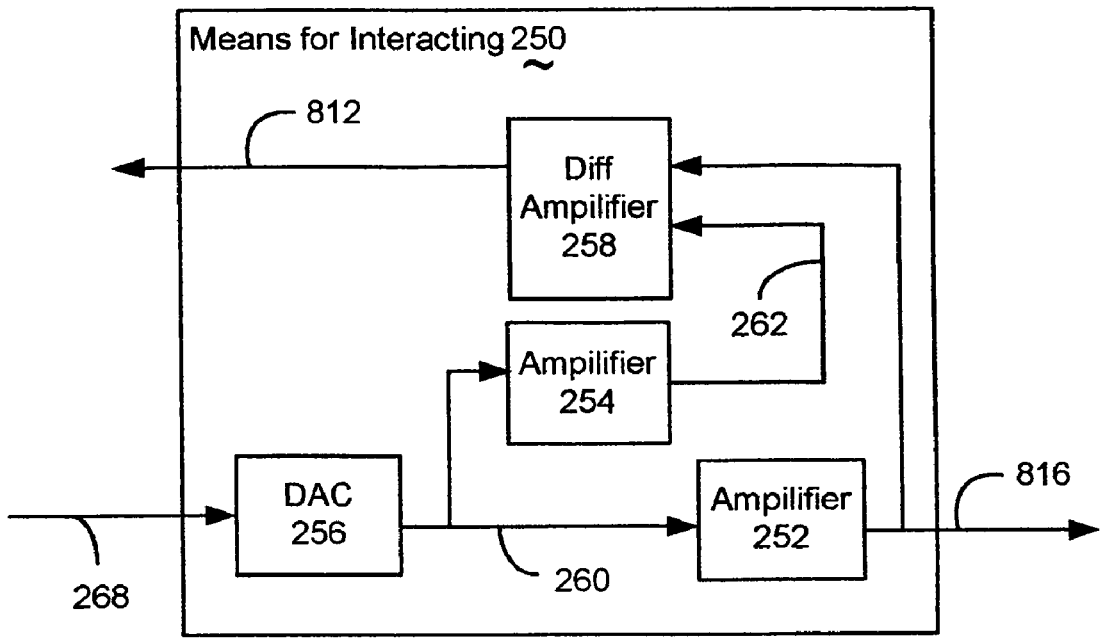
FIGS. 6A and 6B show some component embodiments of the means for the micro-actuator assembly interacting of FIGS. 4 and 5.
Figure 6B:
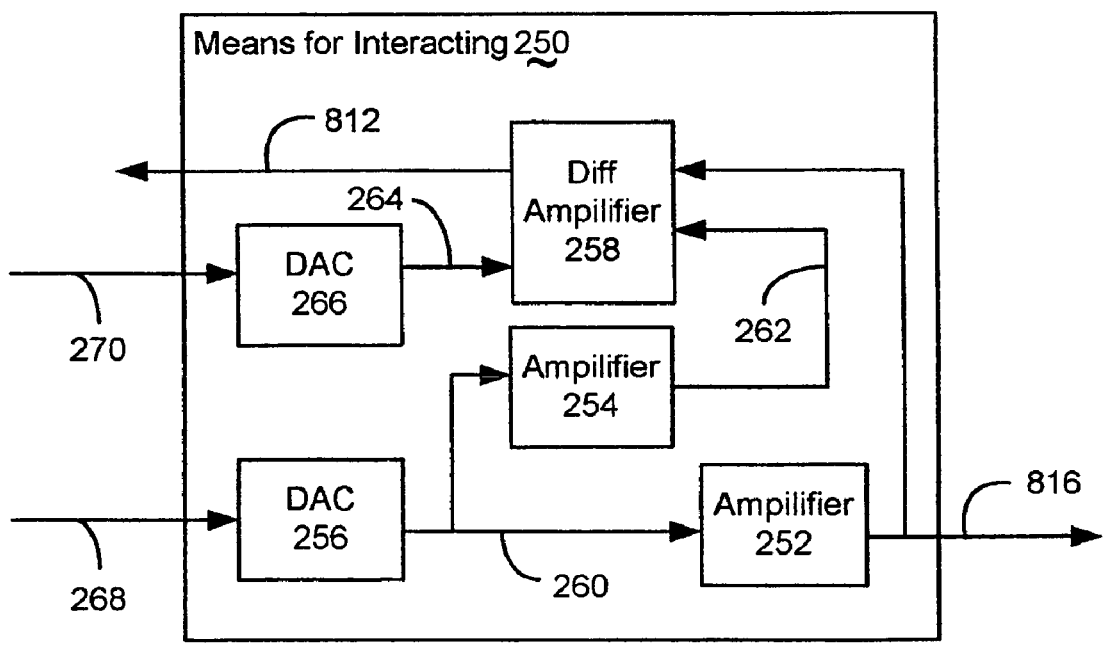

FIGS. 6A and 6B show some embodiments of the means for the micro-actuator assembly interacting 250 driving the micro-actuator control bundle 816, of FIGS. 4 and 5. In some embodiments of the invention, there may be multiple signal paths within the micro-actuator control bundle 816. Each of these signal paths may be driven by components similar to those shown in these Figures. In some embodiments, the means for the micro-actuator assembly interacting 250 may also drive a second micro-actuator control bundle 818 with components similar to that shown in these Figures. Further, there may be multiple signal paths within the second micro-actuator control bundle 818, also driven by components similar to those shown in these Figures.

Figure 7A:
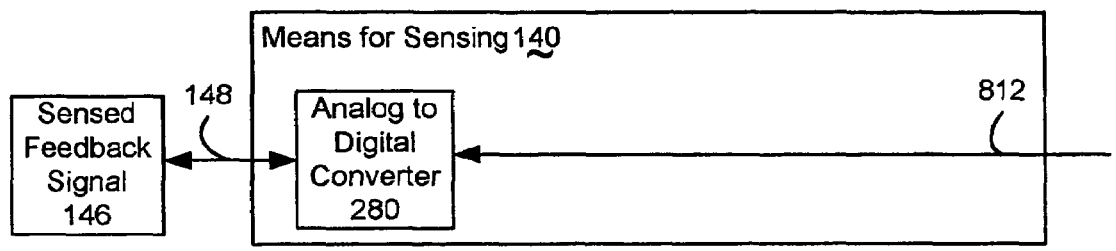
FIGS. 7A to 7D show some embodiments of the means for sensing of FIGS. 1 to 4.

FIGS. 7A to 7D show some embodiments of the means for sensing 140 of FIGS. 1 to 4. FIG. 7A shows the means for sensing 140 coupled to the signal path 812 to at least partly create 148 the sensed feedback signal 146. In various embodiments, the sensed feedback signal 146, or a version of it, may reside in the embedded control memory 120 and/or the servo memory 220, as shown in FIGS. 2 and 8A. The means for sensing 140 includes an Analog to Digital Converter 280 coupled with the signal path 812 to at least partly create 148 the sensed feedback signal 146.

Figure 7B:
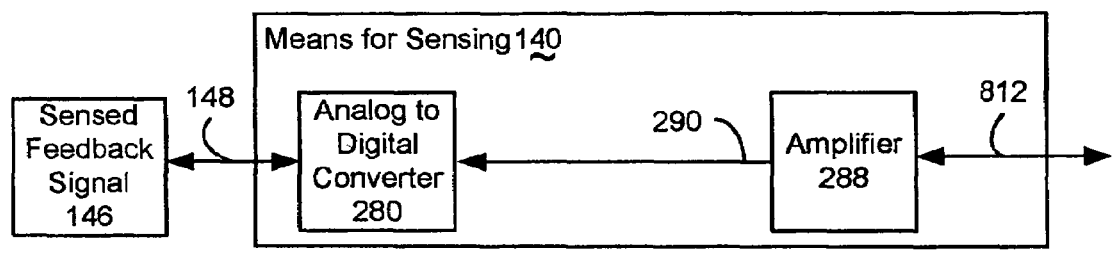
Figure 8A:
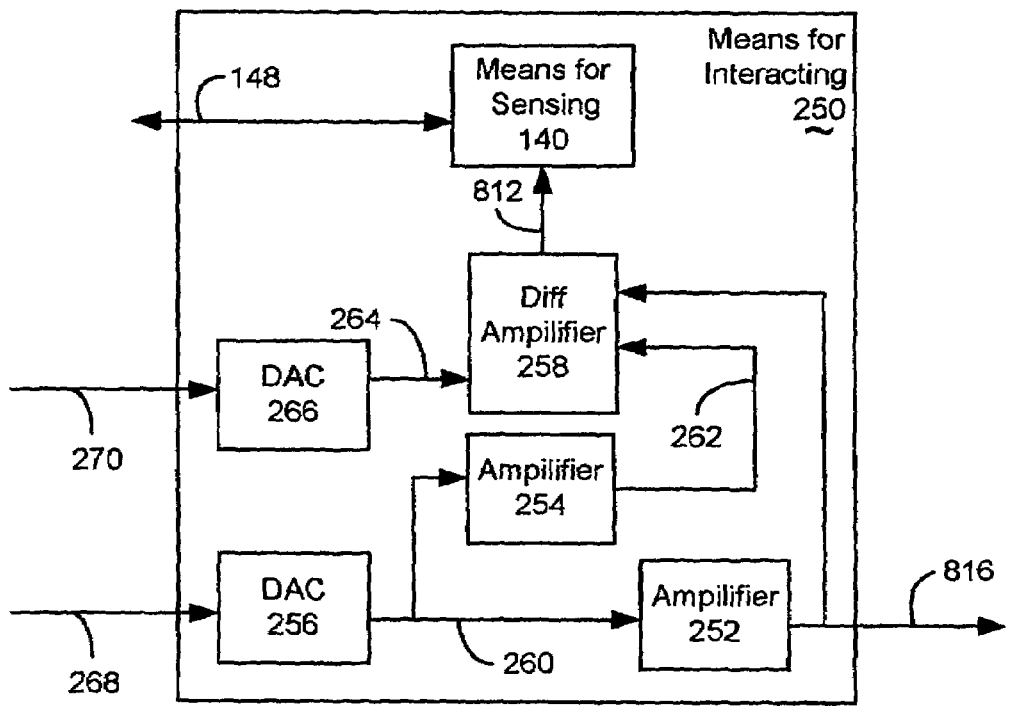
FIG. 8A shows the means for the micro-actuator assembly interacting of FIGS. 4 to 6B including at least one of the means for sensing.

FIG. 7B shows a refinement of the means for sensing 140 of FIG. 7A, further including a third amplifier 288 coupled with the signal path 812 to create an amplified signal 286. The Analog to Digital Converter 280 is coupled with the amplified signal 286 to create 148 at least partly the sensed feedback signal 146.

Figure 7C:
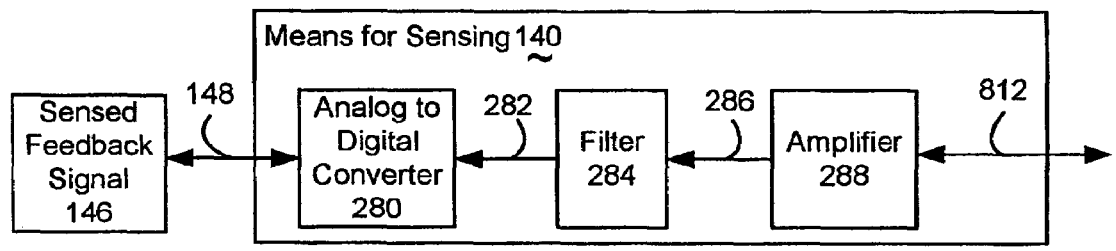

FIG. 7C shows a refinement of the means for sensing 140 of FIG. 7B, further including the Analog to Digital Converter 280 coupled via a filter 284 to the amplified signal 286 to create 148 at least partly the sensed feedback signal 146.

Figure 7D:
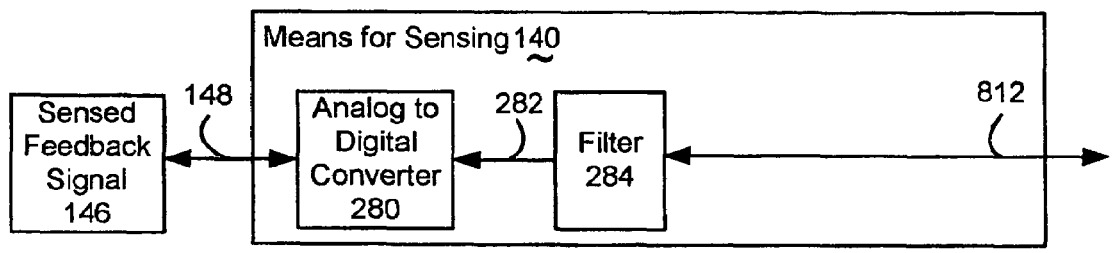

FIG. 7D shows a refinement of the means for sensing 140 of FIG. 7A, further including a filter 284 coupled with the signal path 812 to create a filtered signal path 282. The filtered signal path couples with the Analog to Digital Converter 280 to create 148 at least partly the sensed feedback signal.

FIG. 8A shows the preferred means for the micro-actuator assembly interacting 250 of FIGS. 4 to 6B including at least one of the means for sensing 140. The differential amplifier 258 generates the signal path 812. The means for sensing 140 preferably includes an Analog to Digital Converter 280 as in FIG. 7A. The means for sensing 140 may further preferably include circuitry shown in one of the FIGS. 7B to 7D.

Figure 8B:
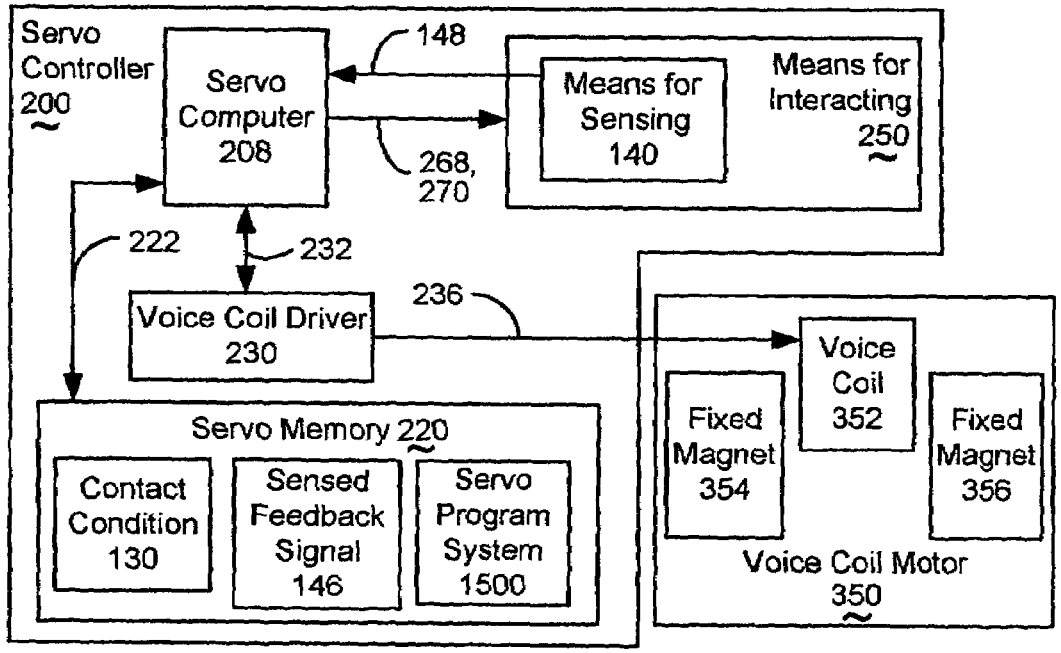
FIG. 8B shows the apparatus for determining the contact condition shown in FIGS. 1 and 3, implemented in the servo controller of FIG. 2, including the means for the micro-actuator assembly interacting of FIG. 8A.

FIG. 8B shows the apparatus for determining 90 the contact condition 130 shown in FIGS. 1 and 3, implemented in the servo controller 200 of FIG. 2, including the means for the micro-actuator assembly interacting 250 of FIG. 8A. The servo computer 208 is second-accessibly-coupled 222 to the servo memory 220. The servo computer 208 is communicatively coupled with the means for the micro-actuator assembly interacting 250 in several ways, shown schematically as multiple arrows, which might be part of a single communications interface. When the sensed feedback signal 146 is created 148, it may be sent via the servo computer 208 and the second-accessible-coupling 222 to reside in the servo memory 220. The contact condition 130 may also reside in the servo memory 220. The servo computer 208 is also controllably coupled 232 to the voice coil driver 230, which generates the voice coil drive signal 236, which is presented to the voice coil 352. The servo program system 1500 implementing the process for determining the contact condition 130 will be further discussed with FIGS. 10A to 11A.

FIG. 9A shows the hard disk drive 10 including the voice coil 352 of FIG. 8B coupled with an actuator arm 360 supporting the micro-actuator assembly 810 and the read-write head 800. The actuator arm 360 is coupled with a head gimbal assembly 362, which couples with, and includes, the micro-actuator assembly 810. The micro-actuator assembly 810 is mechanically coupled with the slider 802, which includes the read-write head 800. The voice coil motor 350, through these couplings, positions the read-write head 800 as it flies over the accessed disk surface 30. The micro-actuator assembly 810 typically refines the positioning of the read-write head 800 through the mechanical coupling of the micro-actuator assembly 810 and the slider 802.

FIG. 9B shows the hard disk drive 10 of FIG. 9A with the voice coil 352 further coupled with a second actuator arm 370 supporting the second micro-actuator assembly 830 and the second read-write head 820. The second actuator arm 370 is coupled with a second head gimbal assembly 372, which couples with, and includes, the second micro-actuator assembly 830. The second micro-actuator assembly 830 is mechanically coupled with the second slider 822, which includes the second read-write head 820. The voice coil motor 350, through these couplings, positions the second read-write head 800 as it flies over the second accessed disk surface 32. The second micro-actuator assembly 830 typically refines the positioning of the second read-write head 820 through the mechanical coupling of the second micro-actuator assembly 830 and the second slider 822.

In FIGS. 8B to 9B, the voice coil motor 350 is shown including the voice coil 352, which moves through a pivot based upon the interaction of its time-varying electromagnet field with the first fixed magnet 354, and preferably with a second fixed magnet 356. The voice coil drive signal 236 generated by the voice coil driver 230 stimulates the voice coil 352 to create the time varying electromagnetic field. As the spindle motor 80 rotates the spindle shaft 82, the first disk 20 rotates, allowing the read-write head 800 to travel over the accessed disk surface 30. This is the normal operational behavior of the hard disk drive 10. In a Crash Start/Stop type of hard disk drive 10, when the hard disk drive prepares to power down, each of the read-write heads is parked near the spindle shaft 82. In an Impact Rebound type of hard disk drive 10, an additional latching mechanism is used. The latching mechanism is positioned off of the disks, so that the read-write head 800 parks off of the accessed disk surface 30.

The invention includes means for implementing the process steps as shown in FIGS. 1 to 4. At least one of these means may use at least one of a computer and/or a finite state machine. The computer may be part of the embedded control system 100 or a part of the servo controller 200. The process may further be implemented using program steps of a program system directing the computer. The process may involve program steps directing one or both the servo computer 208 and the embedded control computer 110 of FIG. 2.

Both the servo computer 208 and the embedded control computer 110 are computers. As used herein a computer includes at least one instruction processor and at least one data processor, where each of the data processors is directed by at least one instruction processor.

Some of the following figures show flowcharts of at least one method of the invention, possessing arrows with reference numbers. These arrows will signify of flow of control and sometimes data supporting implementations including at least one program operation or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

In FIGS. 10A to 11A, the process for determining the contact condition 130 of FIGS. 1 to 4, and 8B is shown implemented using the servo program system 1500 which directs the servo computer 208. The means for the micro-actuator assembly interacting 250 is implemented using the program step 1512 of FIGS. 10A and 11A. The means for sensing 140 is implemented using the program step 1522 of FIGS. 10A. The means for using 160 is implemented using the program step 1522 of FIG. 10A.

Figure 10A:
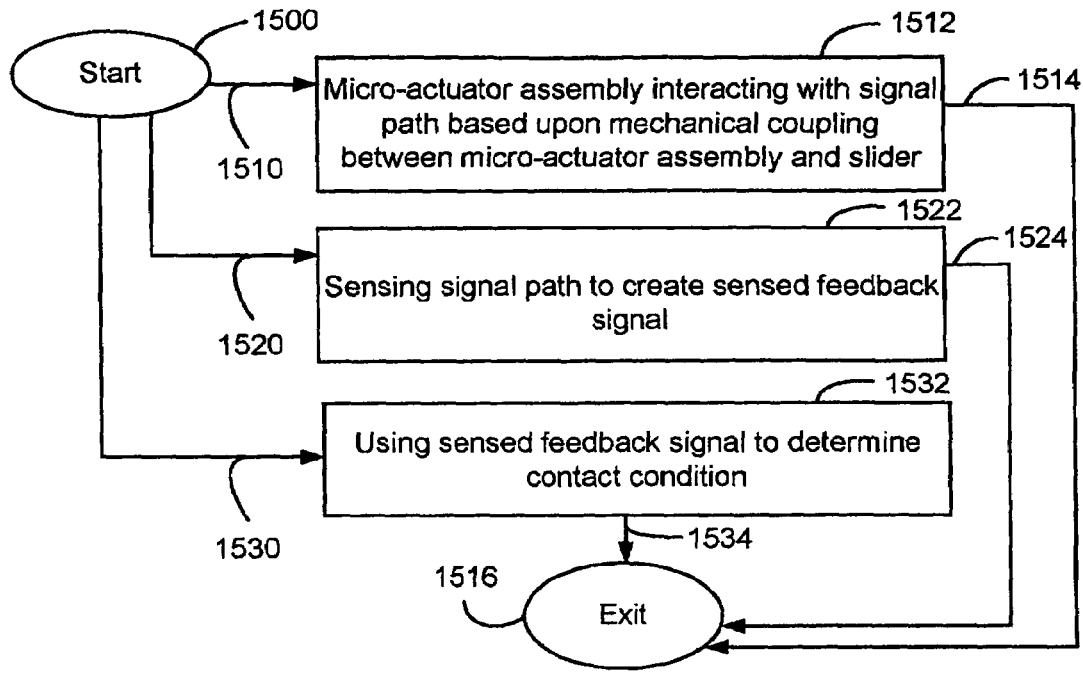

FIG. 10A shows the servo program system 1500 of FIGS. 2 and 8B determining the contact condition 130 for the read-write head 800 flying over the accessed disk surface 30, as shown in the preceding Figures. Operation 1512 supports the micro-actuator assembly 810 interacting with at least one signal path 812 based upon the mechanical coupling between the micro-actuator assembly 810 and the slider 802, which contains the read-write head 800. Operation 1522 supports sensing the signal path 812 to create the sensed feedback signal 146. Operation 1532 supports using the sensed feedback signal 146 to determine the contact condition 130.

Figure 10B:
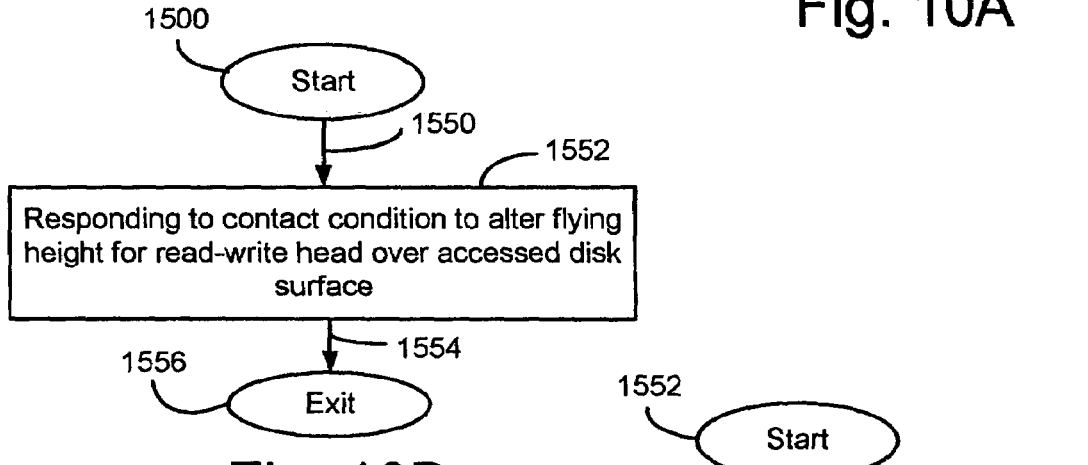
Figure 10C:
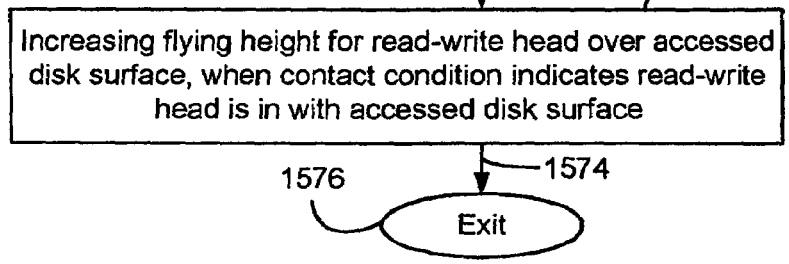

The contact condition 130 is a product of the process. The process may further include responding to the contact condition 130 to alter the flying height of the read-write head 800 over the accessed disk surface 30 as shown in FIGS. 10B and 10C. Altering the flying height may end the contact between the read-write head 800 and the accessed disk surface 30. This may improve the ability of the read-write head 800 to communicate with the accessed disk surface 30. It may limit the possibility of damaging the accessed disk surface 30 and/or read-write head 800. The process may be implemented as operations of the embedded control computer 110 and/or the servo computer 208. The operations of the embedded control computer 110 are directed by the embedded control program system 1000. The operations of the servo computer 208 are directed by the servo program system 1500.

In FIGS. 10B and 10C, the process determining the contact condition 130 is further shown responding to the contact condition 130. This is shown implemented using the servo program system 1500. The means for implementing this process includes the servo controller 200, in particular the servo computer 208 directed by the servo program system 1500.

FIG. 10B shows the servo program system 1500 of FIGS. 2, 8B and 10A responding to the contact condition 130. Operation 1552 supports responding to the contact condition 130 to alter the flying height for the read-write head 800 over the accessed disk surface 30.

In certain preferred embodiments, the micro-actuator assembly 810 may include the ability to increase the flying height of the read-write head 800 above the accessed disk surface 30. The micro-actuator assembly may preferably include more than two piezoelectric devices as shown in FIGS. 4 and 5. In these Figures, the micro-actuator control bundle 816 drives the first piezoelectric device 804, and preferably the second piezoelectric device 806, for lateral positioning of the read-write head 800 across a small number of tracks, often less than ten. The second micro-actuator control bundle 818 drives the third piezoelectric device 808 to alter the flying height of the read-write head 800 above the accessed disk surface 30.

In certain alternative embodiments, the micro-actuator assembly 810 may include two piezoelectric devices, as shown in FIG. 2. In implementations using a means for the micro-actuator assembly interacting 250, it may be preferred that the first piezoelectric device 804 be driven by the micro-actuator control bundle 816 to affect lateral positioning of the read-write head 800 over a small number of tracks on the accessed disk surface 30. The second micro-actuator control bundle 818 may drive the second piezoelectric device 806 to alter the flying height of the read-write head 800 over the accessed disk surface 30.

In certain alternative embodiments, the micro-actuator assembly 810 may include the first piezoelectric device 804 as shown in FIG. 3. In implementations using a means for the micro-actuator assembly interacting 250, it may be preferred that the first piezoelectric device 804 be driven by the micro-actuator control bundle 816 to alter the flying height of the read-write head 800 over the accessed disk surface 30. The micro-actuator assembly may employ an electrostatic device to affect the positioning of the read-write head 800 over a small number of tracks on the accessed disk surface 30.

In certain alternative embodiments, the micro-actuator assembly 810 may not include a piezoelectric device as shown in FIG. 1. In implementations using a means for the micro-actuator assembly interacting 250, it may be preferred that the micro-actuator assembly 810 be driven by the micro-actuator control bundle 816 to alter the flying height of the read-write head 800 over the accessed disk surface 30. The micro-actuator assembly 810 may employ an electrostatic device to alter the flying height of the read-write head 800 over the accessed disk surface 30. The micro-actuator assembly 810 may also employ the same, or another, electrostatic device to affect the lateral positioning of the read-write head 800 over a small number of tracks on the accessed disk surface 30.

FIG. 10C shows the operation 1552 of FIG. 10B further responding to the contact condition 130. Operation 1572 supports increasing the flying height for the read-write head 800 over the accessed disk surface 30, when the contact condition 130 indicates the read-write head 800 is in contact with the accessed disk surface 30.

The means for the micro-actuator assembly interacting 250 with at least one micro-actuator assembly 810 as shown in FIGS. 6A, 6B, and 8A includes a first Digital to Analog Converter 256 which provides a first drive voltage 260 to the first amplifier 252 and to the compensating amplifier 254. The first amplifier 252 drives at least part of the micro-actuator control bundle 816. The compensating amplifier 254 drives a first differential input 262 to a differential amplifier 258. The second differential input to the differential amplifier 258 is coupled to the part of the micro-actuator control bundle 816 driven by the first amplifier 252.

It may be preferred that the differential amplifier 258 in the means for the micro-actuator assembly interacting 250 further includes a gain control 264 as shown in FIGS. 6B and 8A. The means for the micro-actuator assembly interacting 250 preferably includes a second Digital to Analog Converter 266, which receives a feedback signal gain 270. The second Digital to Analog Converter 266 is stimulated by the feedback signal gain 270 to generate the gain control 264 used by the differential amplifier 258.

Figure 11A:
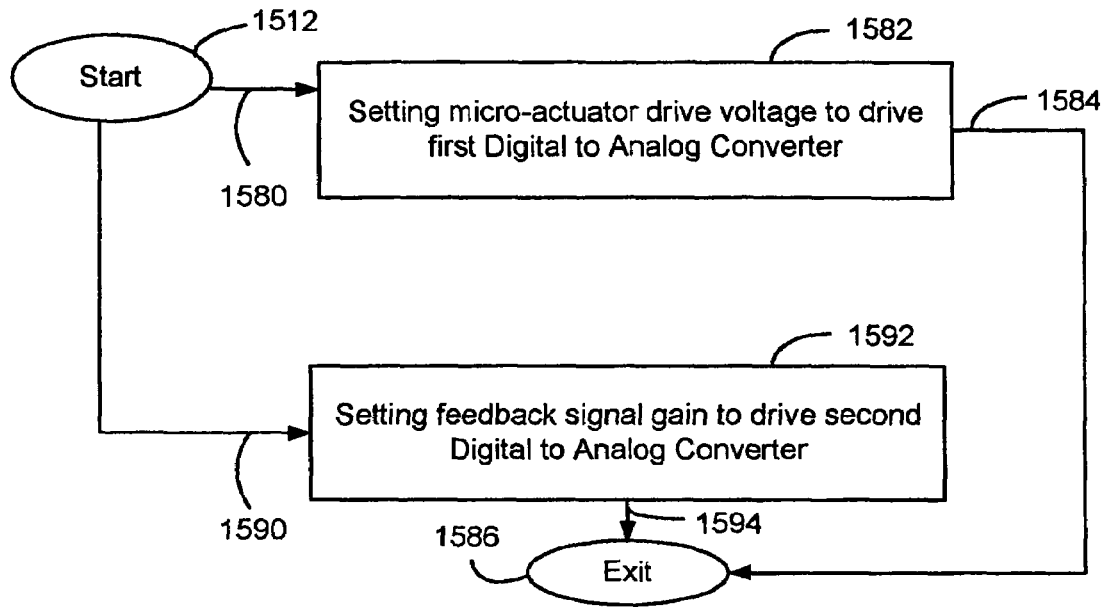

FIG. 11A shows a detail flowchart of operation 1512 of FIG. 10A further supporting the micro-actuator assembly 810 interacting with the signal path 812 shown in part in FIGS. 6A, 6B and 8A. Operation 1582 supports setting a micro-actuator drive voltage 268 to drive the first Digital to Analog Converter 256. Operation 1592 supports setting a feedback signal gain 270 to drive the second Digital to Analog Converter 266. Operation 1592 is used with implementations of the means for the micro-actuator assembly interacting 250 similar to FIGS. 6B and 8A.

The invention's method of predictive failure analysis and its implementation as a means for predictive failure analysis 300 may involve the embedded control program system 1000 and/or the servo program system 1500. By way of example, in FIG. 11B, the means for predictive failure analysis 300 is implemented highlighting the embedded control program system 1000 of FIG. 2. The predictive failure analysis is preferably compatible with the Self-Monitoring Analysis and Reporting Technology typically used in the hard disk drive 10.

The performance parameter estimate 210 may include an estimate of a contact abnormality parameter for a track region, where most or all of the tracks of the accessed disk surface belong to one of the track regions. The performance parameter estimate 210 may further include an estimate of at least one of a spin-up abnormality parameter and a landing abnormality parameter.

Figure 11B:
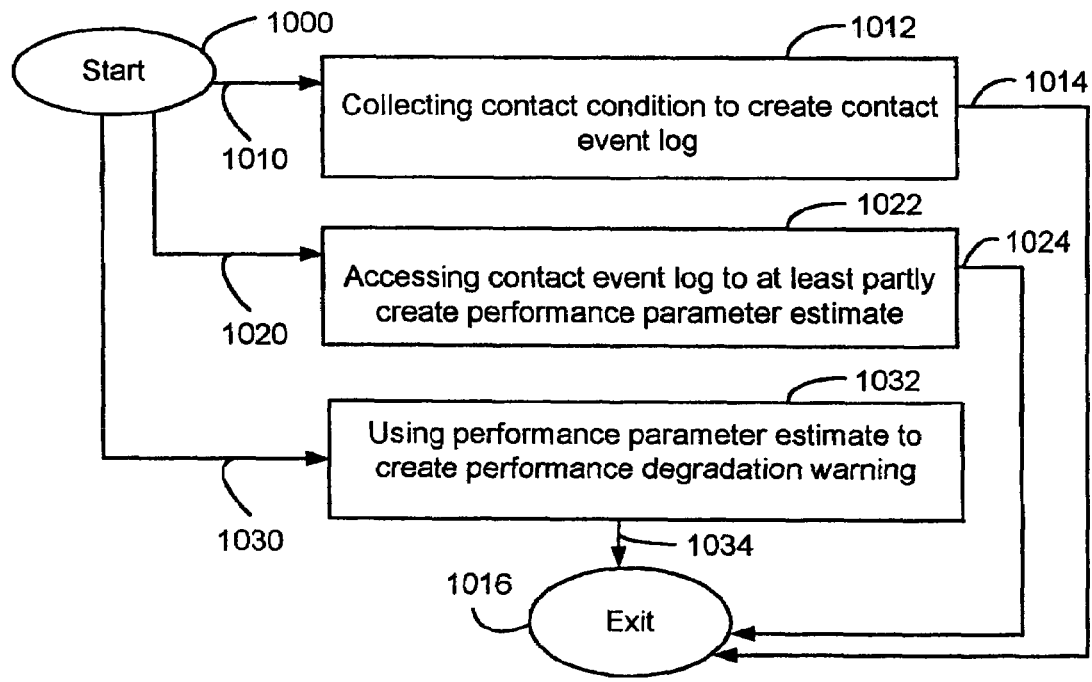
FIG. 11B shows the embedded control program system of FIG. 2 further implementing the method of predictive failure analysis.

FIG. 11B shows the embedded control program system 1000 of FIG. 2 further implementing a method of predictive failure analysis. Operation 1012 supports collecting the contact condition 130 to create a contact event log 202. Operation 1022 supports accessing the contact event log 202 to create at least partly a performance parameter estimate 210. Operation 1032 supports using the performance parameter estimate 210 to create a performance degradation warning 212.

The invention's method for creating a reliability estimate as part of the manufacturing process is shown implemented as the means for creating a reliability estimate 330 in FIGS. 3 and 4. The implementation may involve the embedded control program system 1000 and/or the servo program system 1500. By way of example, the implementation highlights the embedded control program system 1000 in FIGS. 12A and 12B.

Note that the initial contact event log may differ from the contact event log 202 shown in FIGS. 3 and 4. However, it is often preferred that these are similar or possibly identical. For this reason, the initial contact event log is shown as the contact event log 202. This is done to simplify the discussion, and is not means to limit the scope of the claims.

The reliability parameter estimate 192 of FIGS. 3 and 4 may estimate a contact abnormality parameter for a track region, where most or all of the tracks of each accessed disk surface belong to one of the track regions. The reliability parameter estimate 192 may further include estimates of a spin-up abnormality parameter and/or a landing abnormality parameter. The reliability estimate 190 of the hard disk drive 10 may be a form of Mean Time to Failure.

Figure 12A:
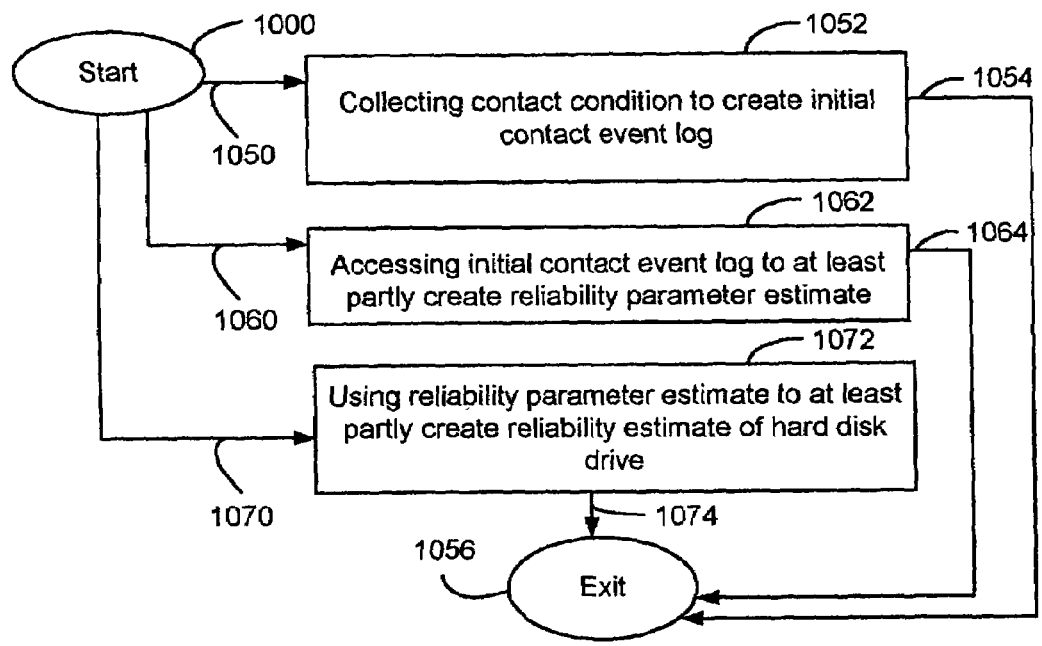
FIG. 12A shows a detail flowchart of the embedded control program system of FIG. 2 further implementing a manufacturing method for, and within, the hard disk drive.

FIG. 12A shows a detail flowchart of the embedded control program system 1000 of FIG. 2 further implementing a manufacturing method for, and within, the hard disk drive 10. Operation 1052 supports collecting the contact condition 130 to create a initial contact event log 202. Operation 1062 supports accessing the initial contact event log 202 to create at least partly a reliability parameter estimate 192. Operation 1072 supports using the reliability parameter estimate 192 to create at least partly a reliability estimate 190 of the hard disk drive 10.

The manufacturing process may further include screening the hard disk drive 10 based upon the reliability estimate 190 of FIGS. 3 and 4 to create a screened hard disk drive 12. The screened hard disk drive 12 is a product of this process.

Figure 12B:
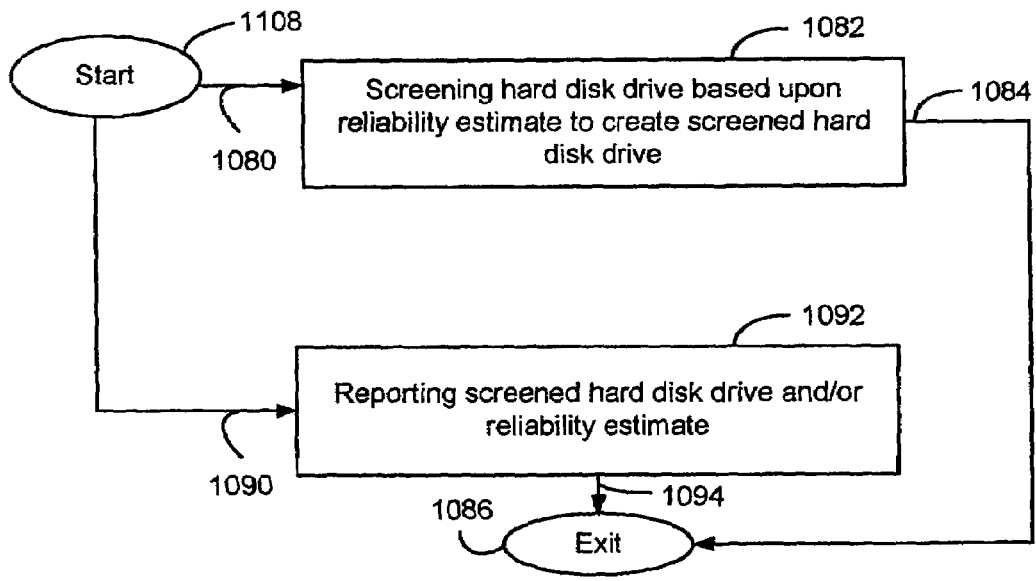
FIG. 12B shows a detail flowchart of the embedded control program system of FIG. 12A further implementing a manufacturing method for and within the hard disk drive.

FIG. 12B shows a detail flowchart of the embedded control program system 1000 of FIG. 12A further implementing a manufacturing method for and within the hard disk drive 10. Operation 1082 supports screening the hard disk drive 10 based upon the reliability estimate 190 to create a screened hard disk drive 12, as shown in FIGS. 3 and 4. Operation 1092 supports reporting the screened hard disk drive 12 and/or the reliability estimate 190.

Figure 13:
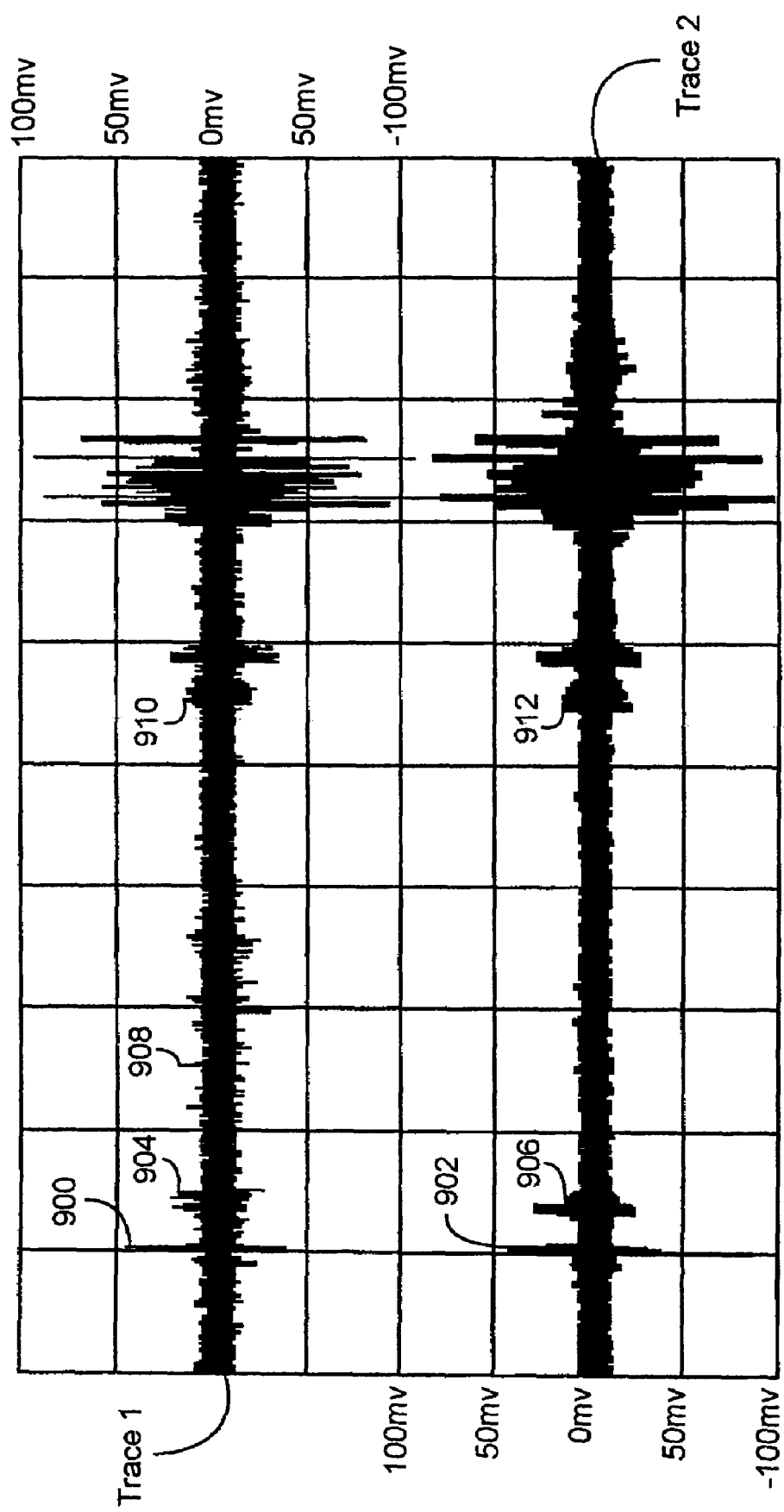
FIG. 13 shows some of the results of experiments using a micro-actuator assembly.

FIG. 13 shows some of the results of experiments using a micro-actuator assembly 810 including a first piezoelectric device 804 and a second piezoelectric device 806 in a Crash Start/Stop type hard disk drive 10. The first piezoelectric device 804 and the second piezoelectric device 806 are both used to laterally position the read-write head 800 over the accessed disk surface 30. In this experiment, the micro-actuator control bundle 816 is coupled with the first piezoelectric device 804. The second micro-actuator control bundle 818 is coupled to the second piezoelectric device 806. The means for sensing 140 includes two instances of the components and circuitry shown in FIG. 7B, generating two instances of the sensed feedback signal 146, one for each piezoelectric device.

In FIG. 13, the state of the first instance of the sensed feedback signal 146 is shown in Trace 1. The state of the second instance of the sensed feedback signal 146 is shown in Trace 2. The horizontal axis represents samples taken over roughly four seconds. The sensed feedback signals of the two piezoelectric devices are shown on the left as the hard disk drive 10 is powered up. The sensed feedback signals of the two piezoelectric devices are shown in the middle of the chart as the first disk 20 rotates at normal speed with the read-write head 800 flying over the accessed disk surface 30. The sensed feedback signals of the two piezoelectric devices are shown on the right as the read-write head 800 lands on the accessed disk surface 30 near the spindle shaft 82 during power down. The vertical scale notations on the left side of the chart show the voltage scale for Trace 2, ranging from roughly −100 milli-Volts (mV) to +100 mV. The vertical scale notations on the right side of the chart show the voltage scale for Trace 1, ranging from roughly −100 milli-Volts (mV) to +100 mV.

In FIG. 13, the powering up of the hard disk drive 10 shows the start of the read-write head 800 taking-off from the accessed disk surface 30 as reference 900 on Trace 1 and reference 902 on Trace 2. After reference 904 on Trace 1 and reference 906 on Trace 2, the read-write head 800 is flying over the accessed disk surface 30. Reference 908 shows the read-write head 800 making contact with the accessed disk surface 30 while the first disk 20 is rotating at normal speed. The landing of the read-write head 800 begins with reference 910 on Trace 1 and reference 912 on Trace 2. In this experiment, when the sensed feedback signal 146 is outside a fairly narrow range, there may be contact between the read-write head 800 and the accessed disk surface 30. This hypothesis is confirmed by the take-off pattern shown in references 900 to 904, as well as confirmed by the landing pattern shown in references 910 and 912.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A hard disk drive, comprising:
a microactuator for positioning a slider and read-write head over a rotating disk drive media surface;
a piezo-electric device included in the microactuator and providing for electronic control of the mechanical position of said slider and read-write head over said rotating disk drive media surface, and providing for a piezo-electric effect output signal if said head mechanically contacts with said rotating disk drive media surface;

means for interacting to extract a sense signal from a differentiation of a microdrive voltage from a servo controller and a voltage on a microactuator control bundle connected to the microactuator;

a means for sensing mechanical contacts of said slider and read-write head with said rotating disk drive media surface interpreted from said sense signal;

a sensed feedback signal produced by the means for sensing and indicating a contact condition of said slider and read-write head with said rotating disk drive media surface.

2. The hard disk drive of claim 1, further comprising:

a contact event log connected to the sensor and for collecting information about mechanical contacts of said slider and read-write head with said rotating disk drive media surface.

3. The hard disk drive of claim 2, further comprising:

a predictive failure analyzer for generating a reliability estimate derived from information about said mechanical contacts in the log, and for generating a mean-time-to-failure (MTTF) value.

4. The hard disk drive of claim 1, further comprising:

a piezo-electric device included in the microactuator and providing for electronic control of the mechanical flying height of said slider and read-write head over said rotating disk drive media surface; and a flying height controller with an output connected to the microactuator and an input connected to receive information about any mechanical contacts of said slider and read-write head with said rotating disk drive media surface, and providing for adjustments of the microactuator to reduce the number of said mechanical contacts occurring.

5. A method for operating a hard disk drive, comprising:

placing a microactuator to position a slider and read-write head over a rotating disk drive media surface;

including a piezo-electric device in the microactuator and providing for electronic control of the mechanical position of said slider and read-write head over said rotating disk drive media surface, and providing for a piezo-electric effect output signal if said head mechanically contacts with said rotating disk drive media surface;

differentiating with means for interacting to extract a sense signal from a comparison of a microdrive voltage from a servo controller and a voltage on a microactuator control bundle connected to the microactuator;

detecting with a means for sensing the mechanical contacts of said slider and read-write head with said rotating disk drive media surface as interpreted from said sense signal;

producing a sensed feedback signal from the means for sensing and indicating a contact condition of said slider and read-write head with said rotating disk drive media surface.

6. The method of claim 5, further comprising:

collecting information about mechanical contacts of said slider and read-write head with said rotating disk drive media surface with a contact event log connected to the sensor.

7. The method of claim 6, further comprising:

generating a reliability estimate derived from information about said mechanical contacts in the log using a predictive failure analyzer, and generating a mean-time-to-failure (MTTF) value.

8. The method of claim 5, further comprising:

providing for electronic control of the mechanical flying height of said slider and read-write head over said rotating disk drive media surface with a piezo-electric device included in said microactuator; and receiving information about any mechanical contacts of said slider and read-write head with said rotating disk drive media surface from a flying height controller with an output connected to said microactuator, and providing for adjustments of the microactuator to reduce the number of said mechanical contacts occurring.

* * * * *